March 1, 1960 J. G. HOFFMAN 2,927,214

SIGNAL TRANSLATING SYSTEM

Filed Jan. 15, 1945

INVENTOR
JOSEPH G. HOFFMAN

BY

ATTORNEY 2,927,214

SIGNAL TRANSLATING SYSTEM

Joseph G. Hoffman, Buffalo, N.Y., assignor to the United States of America as represented by the Secretary of the Navy

Application January 15, 1945, Serial No. 572,949

1 Claim. (Cl. 250—214)

Figure 1:
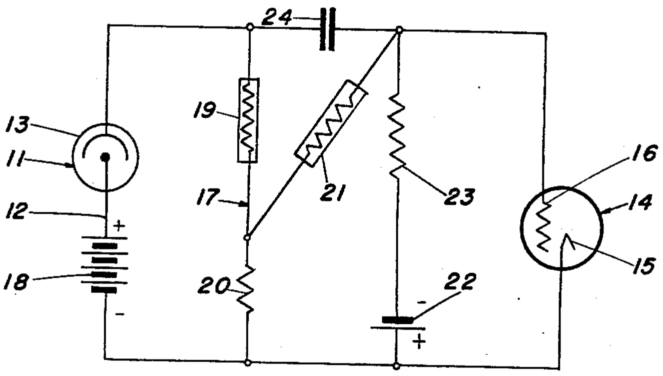

(Granted under Title 35, U.S. Code (1952), sec. 266)

This invention relates to signal translating systems and more particularly to phototube circuits included in proximity fuzes of the type described in the copending application of Joseph E. Henderson, Lawrence R. Hafstad, and Richard B. Roberts, Serial No. 570,689, filed December 30, 1944 entitled "Fuze," now Patent No. 2,892,093, June 23, 1959, for the purpose of converting light variations into amplified electrical signals of magnitudes sufficient to cause the detonation of projectiles.

Prior-art systems of the general class under consideration have required complicated circuits for preventing the generation of a strong output signal which would cause premature detonation of the projectile when the light-sensitive electrical signal generator is exposed to the rays of the sun. It is desirable to provide relatively simple and compact means, light in weight and involving a minimum number of components, in order to prevent sun firing and at the same time to generate an amplified output signal when the phototube comes into proximity to a target. It is also desirable that such means be so arranged that the same change of light intensity or light signal is amplified substantially to the same degree at all light levels encountered under normal conditions of operation.

It is the primary object of the present invention to provide an improved signal translating system which is so simple and compact as to avoid the above-mentioned limitation of prior-art arrangements and which effectively prevents sun firing.

This object is attained in accordance with the invention by providing a signal translating system comprising means for generating electrical signals in response to variations of a radiant-energy influence within a predetermined range of variation, electronic tube means for translating these signals, and an impedance network coupling together the above-mentioned means for reducing the response of the tube means when the radiant-energy influence lies beyond the limitations of the predetermined range. In accordance with another feature of the invention there are provided a load impedance coupled to the phototube, an electronic amplifier for repeating the phototube signal, means including the load impedance for coupling the phototube to the amplifier to translate these signals to the amplifier and means in series with a part of the load impedance for increasing the shunting effect of the coupling means with respect to the load impedance in response to greatly increased phototube output such as that caused by exposure of the phototube to the rays of the sun.

Figure 2:
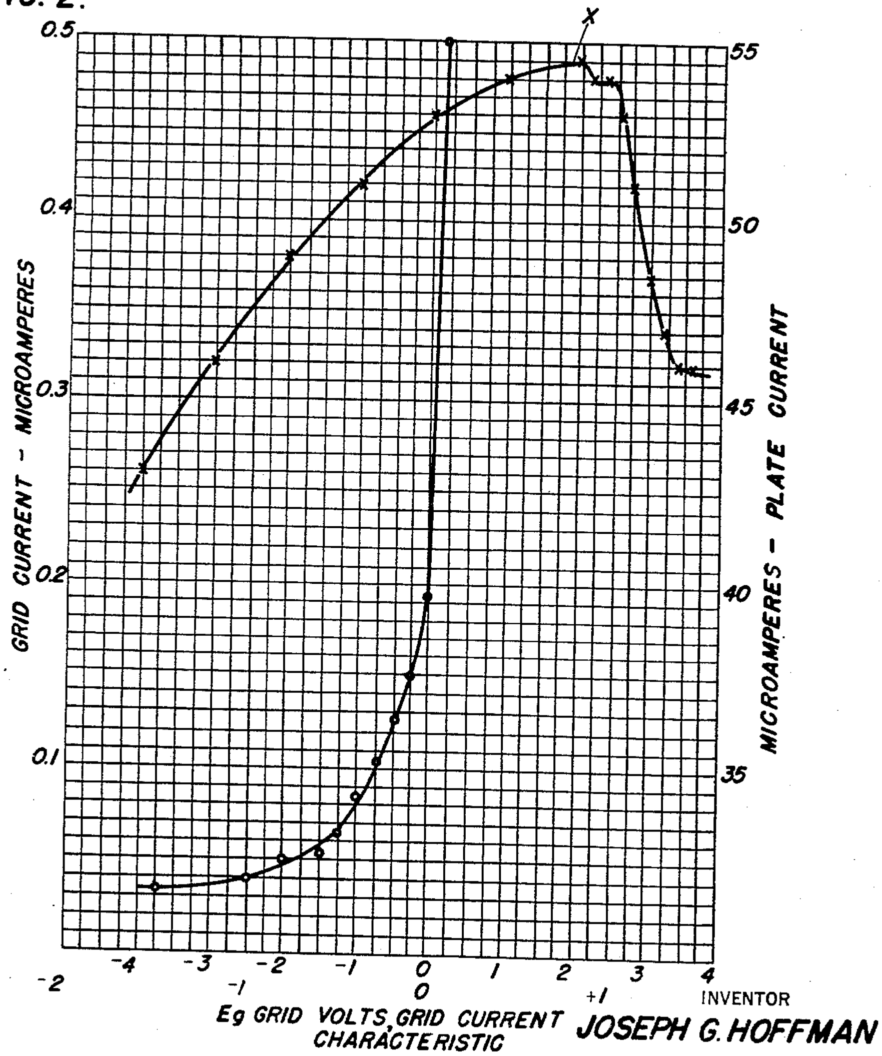

The novel features which are believed to be characteristic of this invention are set forth with particularity in the appended claim. The invention itself, however, both as to its organization and method of operation, and further objects thereof, will best be understood by reference to the following specification, taken in connection with the accompanying drawings, in which:

Fig. 1 is a circuit diagram of an electronic relay constructed in accordance with the invention;

Fig. 2 comprises a set of curves representative of certain operating characteristics of the amplifier included in the Fig. 1 embodiment.

Referring now particularly to Fig. 1 of the drawings there is illustrated one embodiment of my improved electronic relay. The relay includes means for generating electrical signals in response to variations of a radiant-energy influence within a predetermined range of variation. This means comprises a phototube 11, including an anode 12 and a cathode 13, the phototube being sensitive to light variations and effective to generate electrical signals representative thereof. Electronic tube means is also included for translating the signals in amplified form to a utilizing device, which may be the firing squib of a projectile (not shown). This means comprises a vacuum tube 14 having a cathode 15 and a control electrode 16. It will be understood that the last-mentioned electron tube is provided with an anode and suitable circuit connections to sources of space current and filament-heating current (not shown).

An impedance network couples together the above-described phototube and amplifier tube for reducing the response of the amplifier tube when the radiant-energy influence lies beyond the limitations of the predetermined operating range of variation, such as would be the case when the phototube is exposed to the direct rays of the sun. This network comprises a load impedance 17 serially in circuit with cathode 13, anode 12 and a source of phototube space current 18. Impedance 17 comprises a non-linear resistor 19, of the type known commercially under the trade-name "Thyrite," and a linear resistor 20. Non-linear impedance means is also included for applying a biasing potential of positive polarity to the grid of tube 14. This means comprises the linear resistance portion 20 of load impedance 17 and a non-linear resistor 21 coupled at one of its terminals to the junction of resistors 19 and 20 and at the other terminal to grid 16. Resistors 20 and 21 constitute a grid leak for tube 14. Additionally, the input circuit of tube 14 includes a battery 22 and a linear resistor 23, serially disposed in cooperative relationship for applying a biasing potential of negative polarity to grid 16. In order to translate signals from the load impedance to the amplifier, a coupling capacitor 24 is included in circuit between load impedance 17 and the above-described grid leak.

Coming now to a description of the operation of the electronic relay it will be assumed that the above-described circuits have been installed in a projectile which is approaching a target and that the light level is within the normal range of operation. In response to light variations resulting from target proximity the current through photocell 11 fluctuates, so that the load voltage across impedance 17 contains an alternating voltage component or signal as well as a unidirectional voltage component. That portion of the latter appearing in resistor 20 is employed positively to bias grid 16. The former is utilized in amplified form for causing ignition of a firing squib and detonation of the projectile.

Under the conditions assumed, the grid leak 20—21 has an extremely high impedance when grid current is not flowing or when the flow thereof is of small magnitude. Therefore it has substantially no tendency to shunt the load impedance, so that the input signal to the amplifier is relatively strong.

The control grid of the amplifier is normally biased negatively with respect to the cathode by battery 22, and such bias is in an amount sufficient to cause tube 14 to operate on the inclined or linear portion of its transfer characteristic, even though opposed by the bias imposed by phototube current flowing in resistor 20.

The operation of resistor 19 is such that the ratio of the amplitude of the amplifier output signal to the amplitude of the phototube signal is substantially the same for all light levels within a predetermined operating range. Since the impedance of resistor 19 decreases with increased photocell current incident to a higher light level, the product of the photocell unidirectional current and the load impedance parameter 17 remains relatively constant. Therefore increased photocell current within the operating range of light levels does not excessively increase the unidirectional voltage component upon which the signal is superimposed.

Assume now that an abnormal increase in light occurs by reason of the exposure of the photocell to the direct rays of the sun. As noted, the total direct voltage across impedance 17 does not substantially change, but the portion thereof across resistor 20 increases to such a degree that it greatly exceeds the negative bias applied to the amplifier control electrode by battery 22. The amplifier grid is now biased positively, so that the grid-cathode impedance is reduced to a small fraction of that existing for linear operation. Inspection of the curves included in Fig. 2 indicates that as the control electrode bias varies from −2 to 0 volt the amplifier grid to ground impedance changes rapidly from 75 megohms to 0.1 megohm. For all practical purposes this constitutes a shunt to ground for the amplifier grid. Additionally, the operating point of the tube is shifted along the mutual characteristic into region X of lower voltage gain as the phototube current is raised to this critical value. The result is that the amplifier response is reduced, since the transconductance or rate of change of amplifier plate current with respect to amplifier grid voltage is reduced. This nonlinear operation of the amplifier results in a relatively weak output signal. By adjustment of the parameters of the signal translating circuit and the tubes included therein the output signal can be reduced to zero for sun firing conditions and the amplifier tube effectively blocked for input signals.

The reduction of the grid to ground impedance of the amplifier is effective to shunt the load impedance. Moreover, when the control electrode of the amplifier is positively biased, grid current flows in the circuit comprising resistor 20, cathode 15, grid 16 and resistor 21. The effect of this substantial flow of grid current is two-fold: First, the impedance of resistor 21 decreases with an increase in current, tending to bring the grid of amplifier tube 14 to the same potential as the high potential side of resistor 20, thereby to shift the operating point of the amplifier tube to region X before a signal can pass through the time-constant circuit comprising impedance 17 and capacitor 24; second, load impedance 17 is effectively shunted by the reduction in impedance of the grid leak comprising resistors 20 and 21, thereby reducing the input signal voltage applied to the amplifier.

While I do not propose to limit the invention to any specific circuit parameters, the following have been found practical:

| | |
|---|---|
| Resistor **20** | .6 to .8 megohm. |
| Resistor **23** | 10 megohms. |
| Battery **18** | 135 volts. |
| Battery **22** | 2 volts. |
| Amplifier tube **14** | Pentode HY 145 ZT. |
| Capacitor **24** | 0.002 microfarad. |
| Resistor **21** | A type of Thyrite capable of passing one microampere at 15 volts with the exponent *n* of its voltage current curve equal to at least 5. |
| Resistor **19** | Thyrite. |

While there has been described what is at present considered to be a preferred embodiment of this invention, it will be obvious to those skilled in the art that various changes and modifications may be made therein without departing from the invention, and it is therefore, aimed in the appended claim to cover all such changes and modifications as are within the true spirit and scope of the invention.

The invention herein described may be manufactured and used by or for the Government of the United States of America for governmental purposes without the payment of any royalties theron or therefor.

I claim:

An electronic relay comprising a phototube for generating electrical signals representative of light variations with respect to a predetermined range of reference levels, a load coupled to said phototube comprising serially related linear and non-linear impedance units, an electronic amplifier having a cathode and control electrode, a capacitor coupling the output terminal of said phototube to said control electrode for repeating said signals, means for applying a biasing potential to said control electrode having a polarity more negative than said cathode including a linear impedance connecting said cathode and control electrode, means for applying a biasing potential to said control electrode having a polarity more positive than said cathode including a non-linear impedance connecting the linear load impedance unit to said control electrode whereby the operating point on the characteristic curve of said amplifier will be determined by the unidirectional current magnitude in said output circuit so as to repeat said signals through linear operation of said amplifier when said signals correspond to light variations at light levels within a predetermined range and to block said signals through non-linear operation of said amplifier when said signals correspond to light variations at light levels beyond said predetermined range.

References Cited in the file of this patent

UNITED STATES PATENTS

| | | |
|---|---|---|
| 1,415,748 | Weintraub | May 9, 1922 |
| 1,650,092 | Poulsen et al. | Nov. 22, 1927 |
| 1,864,670 | Reynolds | June 28, 1932 |
| 1,889,758 | Nakken | Dec. 6, 1932 |
| 2,219,189 | Lundstrom | Oct. 22, 1940 |
| 2,360,233 | Hussey | Oct. 10, 1944 |

OTHER REFERENCES

Thermistors in Electronic Circuits, Electronic Industries, January 1945, pages 76–80.